July 11, 1939.   C. WOLF   2,165,524
TIMBER CUTTER
Filed July 13, 1937   4 Sheets-Sheet 1
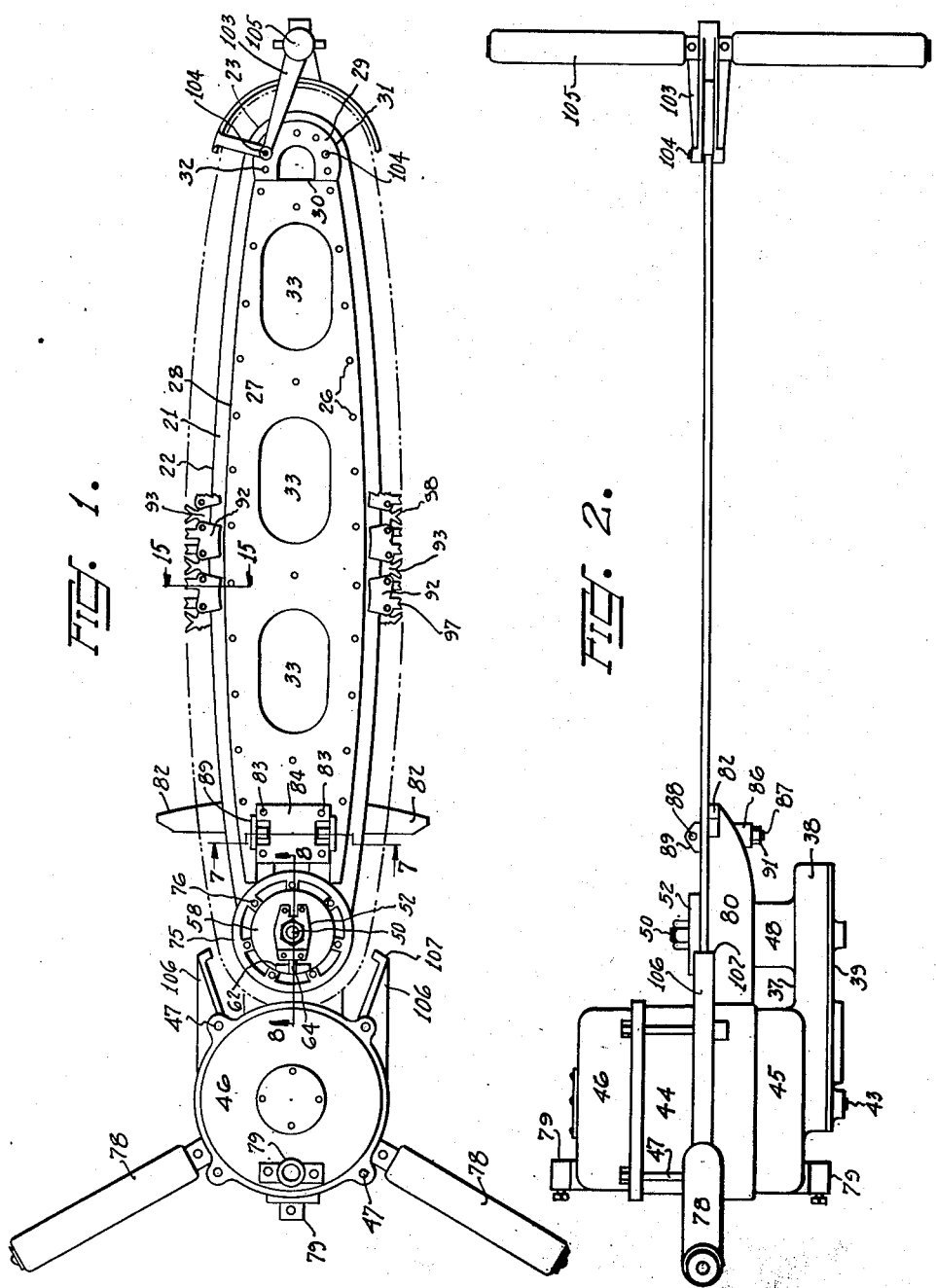
INVENTOR.
CHARLES WOLF
BY
ATTORNEY.

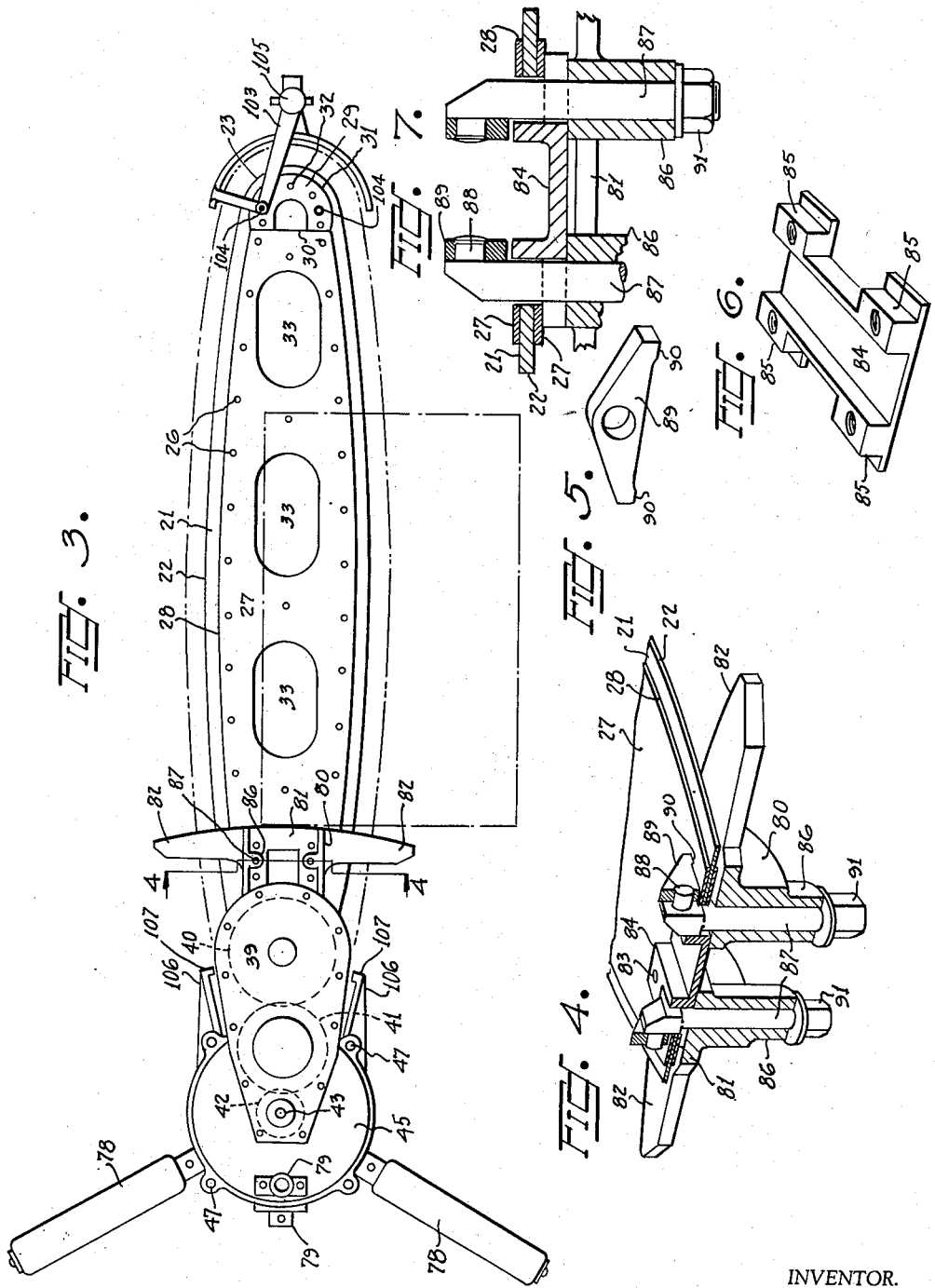

July 11, 1939.  C. WOLF  2,165,524
TIMBER CUTTER
Filed July 13, 1937  4 Sheets-Sheet 3
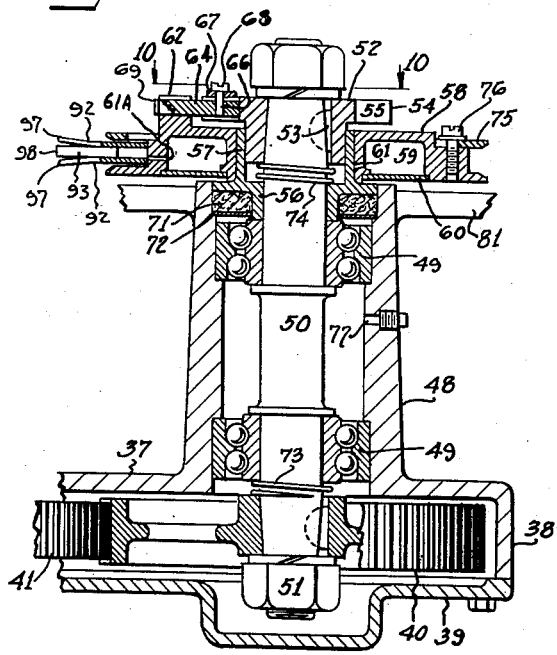
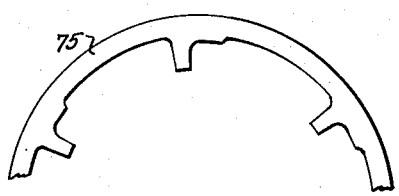
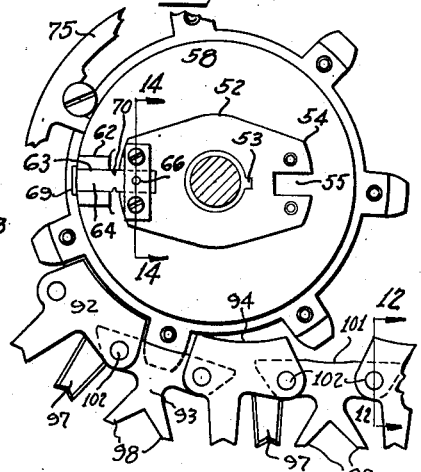
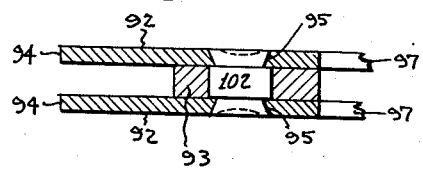
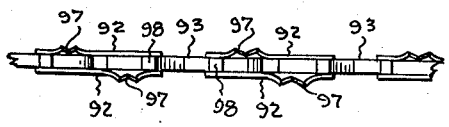
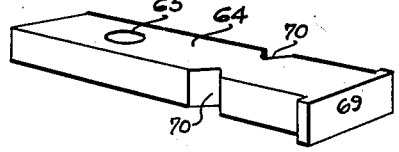
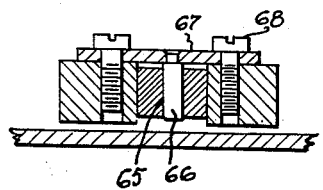
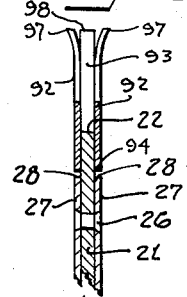
INVENTOR.
CHARLES WOLF
BY
ATTORNEY.

July 11, 1939.  C. WOLF  2,165,524
TIMBER CUTTER
Filed July 13, 1937  4 Sheets-Sheet 4
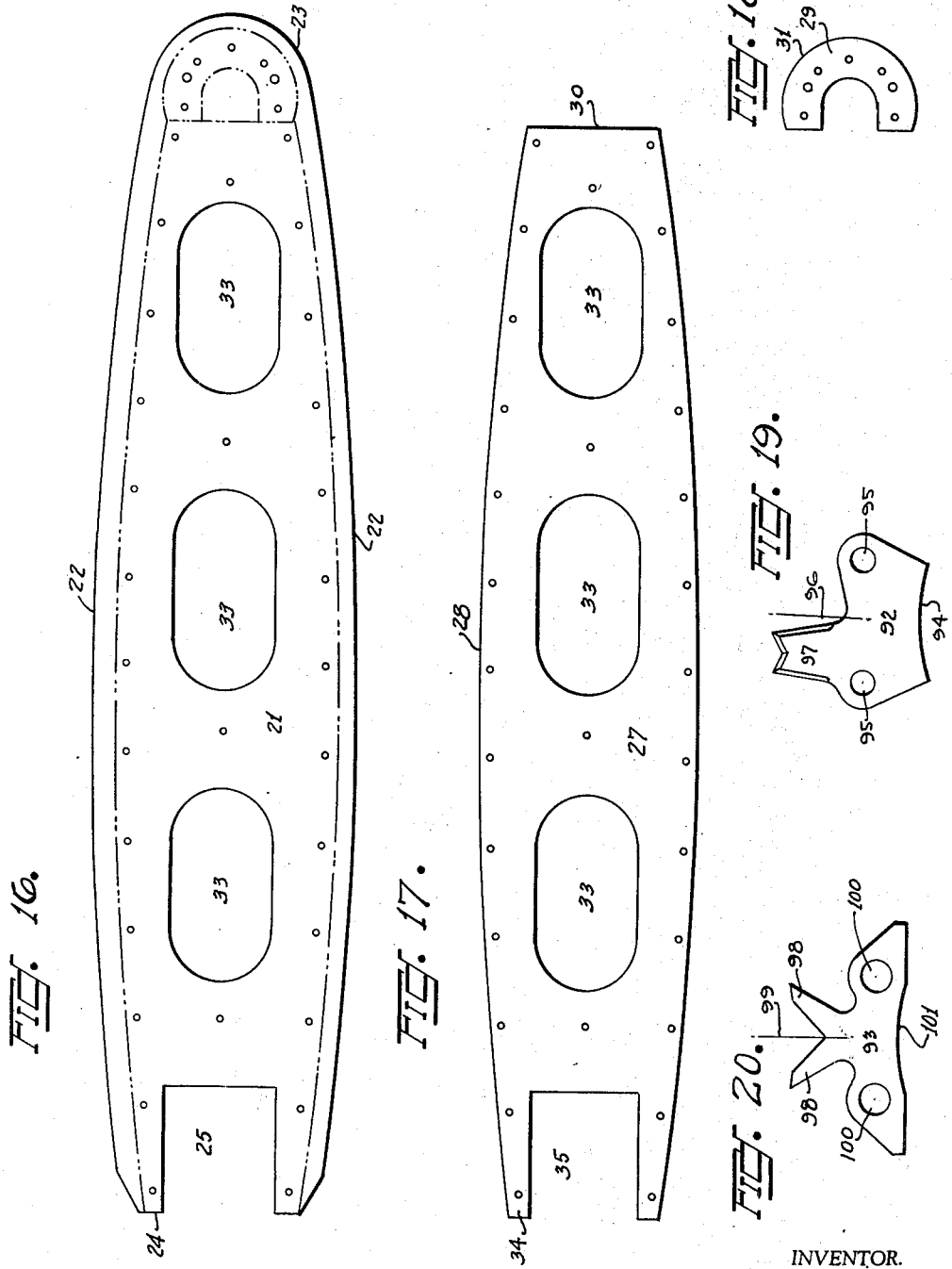
INVENTOR.
CHARLES WOLF
BY
ATTORNEY.

Patented July 11, 1939

2,165,524

UNITED STATES PATENT OFFICE 2,165,524

TIMBER CUTTER

Charles Wolf, Portland, Oreg.

Application July 13, 1937, Serial No. 153,361

1 Claim. (Cl. 143—32)

This invention relates generally to saws, and particularly to link saws.

The main object of this invention is to produce a new form of link saw which will facilitate the construction, operation and repair thereof, special reference being made to my United States Patents Nos. 1,397,026 and 1,526,451, over which this is an improvement.

The following specific objects are obtained: First, a reversal of the tooth structure as compared with my former inventions; second, the construction of an improved guide bar and tooth; third, the provision of an easily removable chain and guide bar; fourth, an improved saw bar construction, including hand holds; fifth, the combination of a motor housing with a gear and bearing housing enclosed for lubricating purposes; sixth, the development of an open sprocket for the purpose of improving the ejection of the sawdust; seventh, the automatic oiling of the saw by the centrifugal action of the sprocket; eighth, the provision of an improved breaker pin; ninth, the use of a demountable rim in the sprocket; tenth, the use of reversible saw bar clamps; eleventh, the use of steel shoes on the end of the aluminum saw bar frame; twelfth, the construction of a frame having a steel center and aluminum side plates; thirteenth, a reduction in the weight of the saw.

I accomplish these and other objects in the manner set forth in the following specification as illustrated in the accompanying drawings, in which:

Fig. 1 is a side elevation of the saw with parts removed therefrom.

Fig. 2 is an edge elevation.

Fig. 3 is a bottom elevation of the complete saw showing itself in relation to the timber being sawed.

Fig. 4 is a section taken along the line 4—4 in Fig. 3.

Fig. 5 is a perspective view of a swivel.

Fig. 6 is a perspective view of a saw bar guide.

Fig. 7 is a fragmentary section taken along the line 7—7 in Fig. 1, showing the clamps turned to a position for releasing the saw bar.

Fig. 8 is a section taken along the line 8—8 in Fig. 1.

Fig. 9 is a fragmentary plan view of a sprocket ring.

Fig. 10 is a section taken along the line 10—10 in Fig. 8.

Fig. 11 is a fragmentary plan of a section of teeth.

Fig. 12 is a fragmentary section taken along the line 12—12 in Fig. 10.

Fig. 13 is a perspective view of a breaker pin.

Fig. 14 is a section taken along the line 14—14 in Fig. 10.

Fig. 15 is a section taken along the line 15—15 in Fig. 1.

Fig. 16 is a side elevation of a saw bar.

Fig. 17 is a side elevation of a saw bar plate.

Fig. 18 is a side elevation of a shoe.

Fig. 19 is a side elevation of a cutter tooth.

Fig. 20 is a side elevation of a raker tooth.

Similar numerals refer to similar parts throughout the several views.

Saw bar

Referring in detail to the drawings, there is shown a saw bar 21 having curved edges 22 and a rounded end 23. The end 24 is provided with a somewhat square cut-out portion 25. This part is preferably made of steel. Secured against the sides of the saw bar 21 by means of the rivets 26 are the saw bar side plates 27 which are preferably made of aluminum or some other light weight metal.

The saw bar side plates 27 are provided with curved edges 28 which are offset from the edges 22 of the member 21. A semi-circular shoe 29 is fitted on the end 30 of each member 27 and the edge 31 of the shoe 29 is concentric with the round end 23. The shoe 29 is secured to the saw bar 21 by means of the rivets 32. Hand holds 33 extend through the bar 21 and the plate 27. The end 34 is provided with a cut-out portion 35 which is equal in width to the cut-out portion 25.

Motor end bell and gear housing

This unit consists of a plate 37 on one side of which is formed a flange 38 provided with a cover 39. Within the housing formed between the plate 37 and the cover 39 is the main drive gear 40, an intermediate gear 41 and a motor pinion 42 which is mounted on the shaft 43 of a motor contained within the motor stator 44. A motor end bell 45 is formed integral with the plate 37 and is connected to the stator 44. The motor end bell 46 forms a cover for the stator 44 and is secured in position by means of the stay bolts 47.

On one side of the plate 37 is formed a tubular extension 48 which contains the bearings 49 in which journals the sprocket shaft 50 on one end of which is secured the gear 40 by means of the nut 51. On the other end of the shaft 50 is mounted a sprocket drive 52 which is secured to the shaft 50 by means of the key 53 and is provided with a flange 54 having the radial slots 55 formed therein. Also surrounding the shaft 50 is a sprocket shaft bushing 56 whose flange 57 surrounds the end of the sprocket drive 52. Around the flange 57 of the bushing 56 is placed the sprocket 58 having an oil chamber 59 formed therein. The plate 60 closes the side of the chamber 59 and the holes 61 permit lubricant to reach the wearing surfaces.

The sprocket 58 has formed thereon the lug 62 which is provided with a slot 63 in which is placed the safety pin 64. The pin 64 is provided with a hole 65 into which extends a pin 66 which is secured to a plate 67 which in turn is secured by means of the screws 68 to the sprocket drive 52.

The pin 64 is provided with a head 69 which is disposed outside of the lug 62. The pin 64 is also provided with lateral notches 70 to insure its breaking at the proper point.

A felt ring 71 and retaining disc 72 surround the bushing 56. A spring 73 is interposed between the gear 40 and its adjacent bearing 49. A spring 74 is interposed between the sprocket drive 52 and the interior of the bushing 56. A demountable rim 75 is placed against one side of the sprocket 58 and is held in place by means of the screws 76. It is desirable to provide an opening 77 in the extension 48 for the insertion of lubricant.

Handles 78 are provided as shown in Fig. 3 and an additional handle support 79 is secured on the motor bell ends 45 and 46 for optional use.

Forming an extension of the motor stator 44 are the ribs 80 which are joined by the plate 81 from which project the stops 82. Secured on the plate 81 by means of the bolts 83 is a saw bar guide 84 whose opposite faces 85 are spaced to permit same to enter the cut-out portions 25 and 35 in the saw bar structure. Extending laterally from the plate 81 are the bosses 86 through which extend the clamp bolts 87 whose laterally projecting pins 88 engage the swivel clamps 89 whose feet 90 engage the face of the saw bar side plate 27, the clamping action being obtained by means of the nuts 91.

*The link saw*

The saw element itself consists of two principal parts, namely, the cutter links 92 and the raker links 93. The cutter links 92 are provided with an arcuate base 94 and the two pin holes 95 which are spaced on opposite sides of the center line 96. A double pointed cutter tooth 97 is formed on one end of the link 92 between the center line 96 and one of the pin holes 95. The raker link 93 is provided with a pair of oppositely pointed raker teeth 98 which are equally spaced on opposite sides of the tooth center line 99. The raker link 93 is provided with pin holes 100 which are equi-distant from the center line 99. The under side 101 of the raker link 93 is curved to conform to the edge 31 of the shoe 29.

In Fig. 12 is shown the manner in which the pair of oppositely turned cutter links 92 are connected to a raker link 93. It will be noted that the connecting rivet 102 is shouldered and the portion of the rivet 102 which extends through the cutter links 92 is countersunk as indicated.

In order to provide a means for handling the saw, there is illustrated a saw guard and handle support 103 which is secured to the saw bar 21 by means of the two bolts 104. Suitable handles 105 are secured to the saw guard and handle support 103. Any desired amount of set may be provided for the cutter links 92.

It will be noted in Figs. 1 and 2 that there is provided a pair of guard arms 106 whose ends 107 are turned toward the center of the shaft 50. The purpose of the ends 107 is to protect the user if the chain should break and also to afford a means for quickly stopping the motor when a broken chain is caught by the end 107 due to the centrifugal action. If a broken chain engages the end 107, it follows that it will either stall the operating motor or cause the shear pin to break.

From the foregoing it will be seen that a saw so constructed will possess numerous advantages over the saw illustrated in my former patents above identified.

It can be seen that in the normal operation of the saw one of the raker teeth 98 on each raker link 93 is leading. The same is true of the points on each cutter tooth 97. Naturally the leading teeth do the most cutting and will dull the sooner. Should it be desired to reverse the cutting action by turning the link saw over in its frame, it is only necessary to remove the demountable rim 75 and the saw guard 103 and the entire link saw may be lifted out of position and reversed.

It may be seen from the foregoing that the various objects enumerated in the preamble of this specification are obtained by the construction set forth herein.

The holes 61—A in the sprocket wheel 58 permit lubricant to flow from the chamber 59 to the chain saw due to the centrifugal action set up while the saw is in operation, whereas the holes 61 permit lubricant to enter between the friction surfaces of the sprocket wheel 58 and the flange 57.

The purpose of making the teeth 97 and 98 double pointed is to increase the life thereof. Obviously, the leading tooth in each case does the major portion of the cutting or raking as the case may be while the trailing tooth is actually sharpened as it follows in the cut.

I claim:

In a saw of the class described the combination of a driving unit, a slotted saw bar associated with said driving unit, means for clamping said saw bar to said driving unit, a chain disposed around said saw bar, guard arms disposed in a plane adjacent to the run of said chain and a breaker pin disposed between said driving unit and said chain whereby upon breakage of said chain the centrifugal force thereof whips the broken end of the chain into engagement with said guard thereby overloading the drive mechanism and causing a breakage of said pin.

CHARLES WOLF.